(No Model.)
R. REARDON.
CAR COUPLING.
No. 475,153. Patented May 17, 1892.
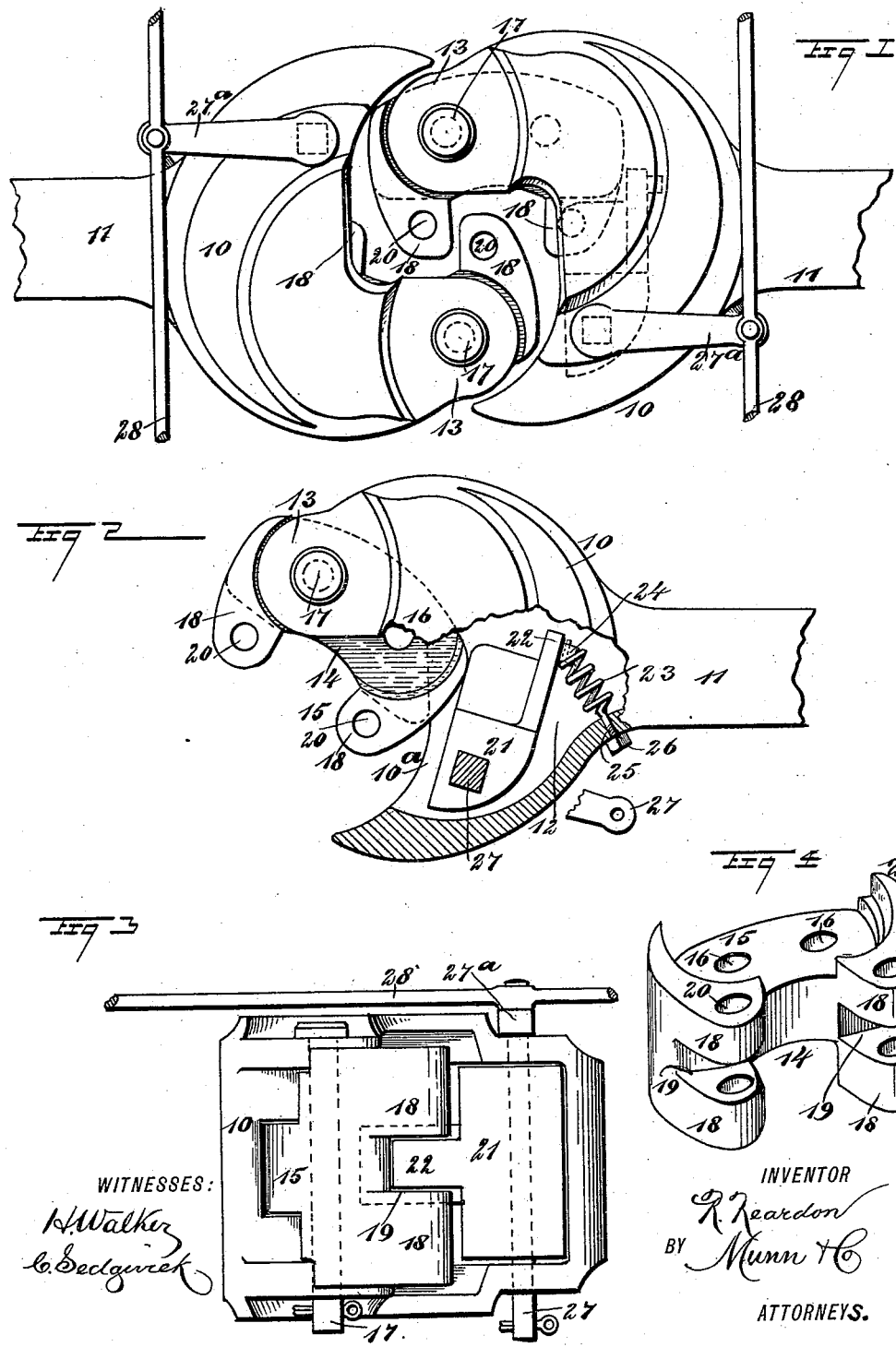
WITNESSES:
H. Walker
C. Sedgwick
INVENTOR
R. Reardon
BY Munn & Co.
ATTORNEYS.

UNITED STATES PATENT OFFICE.

ROBERT REARDON, OF SAVANNAH, GEORGIA.

CAR-COUPLING.

SPECIFICATION forming part of Letters Patent No. 475,153, dated May 17, 1892.

Application filed September 29, 1891. Serial No. 407,124. (No model.)

*To all whom it may concern:*

Be it known that I, ROBERT REARDON, of Savannah, in the county of Chatham and State of Georgia, have invented a new and Improved Car-Coupling, of which the following is a full, clear, and exact description.

My invention relates to improvements in car-couplings which are adapted to automatically couple cars together. The couplings in which coupling knuckles or hooks are used frequently get out of repair on account of the hooks breaking, and consequently the car is laid up and cannot be used until a new hook is supplied.

The object of my invention is to obviate this difficulty by producing a double or reversible locking hook or knuckle which may be quickly changed, so that either end may be used, and also to provide a positive locking mechanism which will hold the coupling-hook in such a position that it cannot accidentally be displaced, and, further, to provide a lever mechanism by means of which the coupling may be unlocked without going between the cars.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken plan view of two engaged couplings, showing my improvements. Fig. 2 is a broken plan view, partly in section, of one of the couplings. Fig. 3 is a broken end view of the same, and Fig. 4 is a detail perspective view of the double coupling knuckle or hook.

The draw-head 10 is provided with the usual rearwardly-extending draw-bar 11, which is adapted to be supported on the under side of the car, and the draw-head has a concave front face 10ª and is internally recessed throughout, as shown at 12 in Fig. 2. One corner of the draw-head 13 projects slightly forward from the body portion of the draw-head, and in this projecting portion is pivoted the coupling knuckle or hook 14, which hook has a reduced central portion 15 and has near each end of the reduced portion a hole 16, adapted to receive the pivot-pin 17, which pin extends downward through the draw-head and hook and is held by a key, so that it cannot be accidentally displaced. The shank 15 terminates at each end in a widened and inwardly-curved hook 18, which is horizontally recessed, as shown at 19, so as to receive an ordinary coupling-link, and which is provided with a vertical hole 20, adapted to receive the usual coupling-pin. The hook can thus be coupled to the old-fashioned coupling, and it may be also coupled to any of the more common forms of couplings.

It will be noticed that the coupling knuckle or hook is pivoted near its forward end, so that the rear end will swing in the recess 12, and when the coupling is unlocked will swing forward in advance of the draw-head. The knuckle or hook is adapted to engage a similar hook on an opposing coupling, and it is held in locked position by a dog 21, which is pivoted in the recess 12 on the side of the draw-head opposite the hook and which has a central projection 22, adapted to enter the recess 19 at the rear end of the coupling-hook, and when the hook is swung rearward, so that the dog swings in front of it, the hook cannot be released. The dog is normally pressed forward by a spiral spring 23, one end of which is secured to a clip 24 on the back side of the dog and near the free end of the same, and the other end of the spring is formed into a bolt 25, which projects through the wall of the draw-head and is provided with a fastening-nut 26. The dog 21 is pivoted on a spindle 27, which extends vertically through the draw-head and is held in place by a key, and that portion of the spindle which passes through the dog is squared, so that the spindle and dog will turn in unison. The upper end of the spindle is provided with a crank-handle 27ª, and this is secured to a lever 28, which extends to a point where it may be conveniently reached from the sides of the car, and by operating the lever and crank-handle the dog 21 may be turned back, so as to release the coupling-hook and allow the engaged couplings to be pulled apart.

The coupling may be used on either freight or passenger cars, and when used on freight-cars any form of common lever mechanism may be used whereby the coupling may be unlocked from the top of the car.

The operation of the coupling is as follows: When unlocked, the rear end of the coupling hook or knuckle will extend in front of the dog 21, as in Fig. 2, and will project slightly in advance of the draw-head. When, however, an opposing coupling is pushed against it, the rear ends of the two coupling-hooks will come into engagement and the hooks will be pushed backward, so as to allow the dog 21 to spring forward, and when this dog advances in front of the coupling-hook it will be seen that the hook will be locked and the couplings held in secure engagement. If the front end of the coupling-hook is broken, the hook may be instantly reversed by moving the pin 17, and the coupling-hook will be as good as new.

It will be noticed that if one end of the hooks is broken, so that it will not engage an opposing hook, it will still work sufficiently well when arranged in the recess 12 of the draw-head, as there will be sufficient body to the hook or knuckle to engage the end of the dog.

Having thus fully described my invention, I claim as new and desire to secure by Letters Patent—

1. In a coupling of the character described, a coupling hook or knuckle hooked at both ends and provided with two pivotal points between its ends to render it readily reversible, substantially as set forth.

2. In a coupling of the character described, a reversible coupling hook or knuckle provided with a transversely-recessed hook at each end and with a pivot-aperture adjacent to each hook, substantially as set forth.

3. A car-coupling comprising a horizontally-recessed draw-head, a reversible locking hook or knuckle pivoted in one side of the draw-head, and a locking device to engage the hook, substantially as described.

4. A car-coupling comprising a horizontally-recessed draw-head, a double coupling hook or knuckle pivoted in one side of the draw-head, the rear end of the hook being adapted to swing in the draw-head, a spring-pressed dog held to swing horizontally in the draw-head and adapted to engage the coupling-hook, and a lever mechanism for moving the dog against the spring, substantially as described.

5. In a car-coupling, the combination, with the recessed draw-head having a locking device therein, of a double coupling hook or knuckle, said hook comprising a reduced central portion having a pivot-hole near each end and having a coupling-hook at each end, substantially as described.

6. The combination, with the locking-dog and the draw-head, of a spring having one end secured to the dog and having the other end formed into a bolt, which is attached to the draw-head, substantially as described.

ROBT. REARDON.

Witnesses:
JOHN S. AUSTIN,
E. C. GLEASON.